United States Patent

Hanazaki et al.

[11] Patent Number: 5,758,860
[45] Date of Patent: Jun. 2, 1998

[54] RADIATOR SUPPORT

[75] Inventors: Masahiko Hanazaki, Nagoya; Kohei Hori; Masayuki Shikuya, both of Aichi-ken, all of Japan

[73] Assignee: Tokai Rubber Industries, Ltd., Komaki, Japan

[21] Appl. No.: 773,323

[22] Filed: Dec. 24, 1996

[30] Foreign Application Priority Data

Dec. 27, 1995 [JP] Japan .................................. 7-353301

[51] Int. Cl.⁶ .................................................. F16M 13/00
[52] U.S. Cl. ......................... 248/634; 248/635; 180/68.4; 297/141; 403/225
[58] Field of Search ........................... 248/634, 635, 248/55, 56; 180/68.4; 297/141–141.5; 403/227, 228, 225, 220

[56] References Cited

U.S. PATENT DOCUMENTS

| | | | |
|---|---|---|---|
| 2,239,319 | 4/1941 | Halford et al. | 248/634 |
| 2,273,869 | 2/1942 | Julien | 248/22 |
| 3,929,201 | 12/1975 | Hoffman | 180/68 R |
| 4,089,496 | 5/1978 | Mizusawa | 248/56 |
| 4,139,053 | 2/1979 | Schaal | 165/71 |
| 4,651,839 | 3/1987 | Isobe | 180/68.4 |
| 4,858,866 | 8/1989 | Werner | 248/213.3 |
| 5,170,985 | 12/1992 | Killworth et al. | 248/635 |
| 5,545,854 | 8/1996 | Ishida | 248/56 |

FOREIGN PATENT DOCUMENTS 60-11317  3/1985  Japan .

*Primary Examiner*—Ramon O. Ramirez
*Assistant Examiner*—Anita M. King
*Attorney, Agent, or Firm*—Oblon, Spivak, McClelland, Maier & Neustadt, P.C.

[57] ABSTRACT

A radiator support includes a rigid inner tube member, a rigid outer tube member, and a rubber elastic member. The rigid inner tube member has a radial through concavity formed through the inner peripheral portion in the radial direction, or the rigid outer tube member has a radial through concavity formed through the outer peripheral portion in the radial direction. The rubber-elastic member has a convexity formed at least on one of the inner peripheral portion and the outer peripheral portion. The convexity extends inward or outward, and fits into the radial through concavity of the rigid inner tube member to inwardly project from the inner peripheral portion thereof, or into the radial through concavity of the rigid outer tube member to outwardly project from the outer peripheral portion thereof. Thus, the rigid inner tube member can be assembled with an engagement pin of a radiator in favorable engagement, and the rigid outer tube member can be assembled with an engagement hole of a vehicle-side installation member in favorable engagement. As a result, the radiator support can inhibit abnormal noises from generating, and is less likely to come off from the radiator.

38 Claims, 8 Drawing Sheets

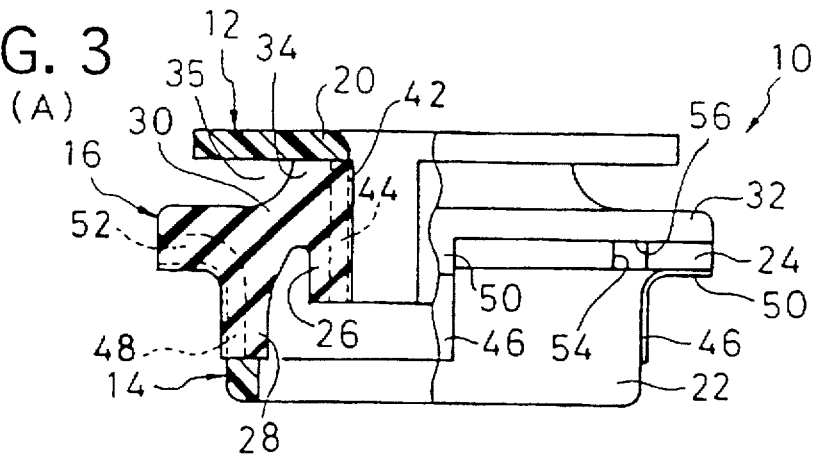
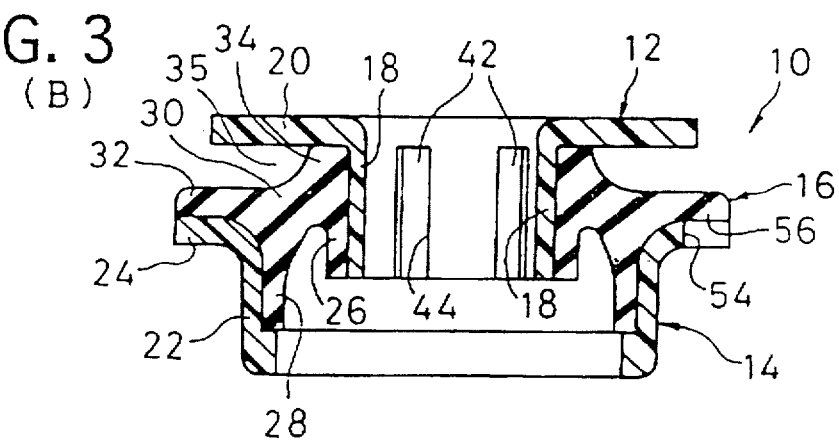
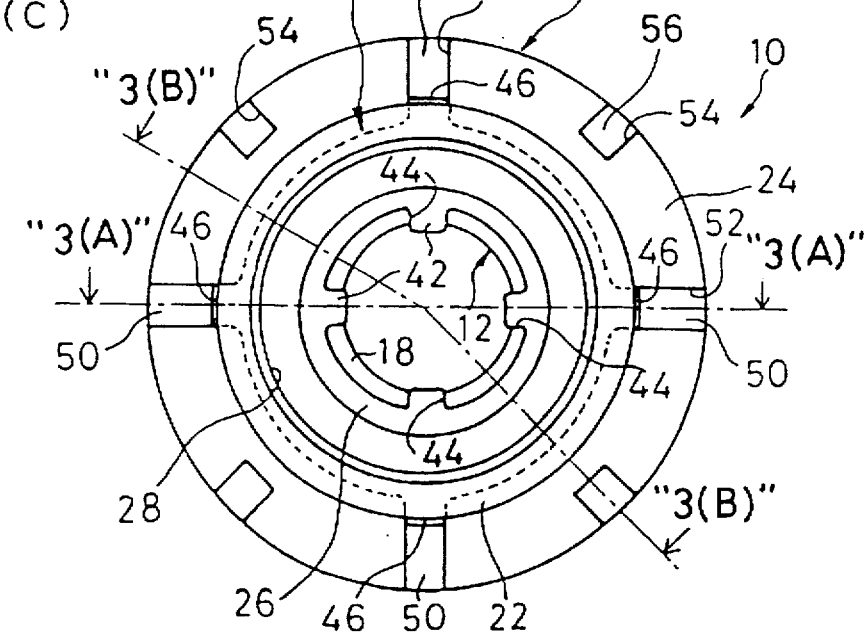

RADIATOR SUPPORT

BACKGROUND OF THE INVENTION

1. Field of the Invention

The present invention relates to a radiator support which can be disposed between a radiator and a vehicle-side installation member to elastically support the radiator.

2. Description of the Related Art

A radiator support is disposed between a radiator and a vehicle-side installation member, and accordingly supports the radiator elastically in a floating manner. The radiator support utilizes the radiator as an inertial mass in order to suppress the vibrations of a vehicle body.

As disclosed in Japanese Examined Patent Publication (KOKOKU) No. 60-11,317, such a radiator support has been known. For example, a conventional radiator support is constructed as illustrated in FIG. 8.

As shown in FIG. 8, the conventional radiator support includes a rubber-elastic member 200, an inner tube fitting 202, and an outer tube fitting 204. The inner tube fitting 202 is buried in an inner side of the rubber elastic member 200, and the outer tube fitting 204 is buried in an outer side thereof. The rigid inner and outer tube fittings 202 and 204 have a thickness of about 1.2 mm, respectively. The conventional radiator support is fitted into an engagement hole 208 of a vehicle-side installation member 206 at the outer peripheral end in which the outer tube fitting 204 is buried. Moreover, an engagement pin 210 extends downward from a radiator, and is fitted into the inner peripheral end of the conventional radiator support in which the inner tube fitting 202 is buried. Thus, the conventional radiator support is assembled between the radiator and the vehicle-side installation member 206.

In the conventional radiator support, the relative displacements between the vehicle-side installation member 206 and the radiator are absorbed mainly by the elastic deformations of an intermediate member 212 in the rubber-elastic member 200.

Based on the conventional radiator support, it is possible to think of modifying the conventional radiator support by employing a rigid inner tube member and a rigid outer tube member which are made from a resinous material, and by connecting the rigid inner tube member and the rigid outer tube member with a rubber-elastic member interposing therebetween. If such is the case, it is possible to decrease the overall weight of the conventional radiator support, and at the same time to reduce the manufacturing cost thereof.

Considering the workability in assembling the thus modified conventional radiator support, it is necessary to secure a proper engagement clearance between the rigid inner tube member and the engagement pin which extends downward from the radiator, and between the rigid outer tube member and the engagement hole of the vehicle-side installation member, respectively.

However, when the modified conventional radiator support, provided with the engagement clearances, is assembled with the radiator and the vehicle-side installation member, there are clearances between the rigid inner tube member and the engagement pin, and between the rigid outer tube member and the engagement hole of the vehicle-side installation member, respectively. Accordingly, when a vehicle is driven, the engagement pin is brought into contact with the rigid inner tube member, and the rigid outer tube member is brought into contact with the engagement hole. As a result, there is a fear for generating abnormal noises.

Moreover, when transporting a radiator with the modified conventional radiator support assembled, the modified conventional radiator support might come off from the radiator.

SUMMARY OF THE INVENTION

The present invention has been developed in order to solve the problems associated with the conventional radiator support.

In a first aspect of the present invention, a radiator support is disposed between a radiator having an engagement pin and a vehicle-side installation member having an engagement hole and a top surface, and comprises:

a rigid outer tube member fitted into the engagement hole of the vehicle-side installation member;

a rigid inner tube member fitted around the engagement pin of the radiator, and having an inner peripheral portion, an inner space disposed inside the inner peripheral portion, and a radial through concavity formed through the inner peripheral portion in a radial direction thereof; and a rubber-elastic member disposed between the rigid outer tube member and the rigid inner tube member, and having an inner peripheral portion and a convexity formed on the inner peripheral portion, the convexity extending inward, disposed at a position corresponding to the radial through concavity of the rigid inner tube member, and fitted into the radial through concavity to project inward from the inner peripheral portion of the rigid inner tube member to the inner space thereof.

In a second aspect of the present invention, a radiator support is disposed between a radiator having an engagement pin and a vehicle-side installation member having an engagement hole and a top surface, and comprises:

a rigid outer tube member fitted into the engagement hole of the vehicle-side installation member, and having an outer peripheral portion, and a radial through concavity formed through the outer peripheral portion in a radial direction thereof;

a rigid inner tube member fitted around the engagement pin of the radiator; and a rubber-elastic member disposed between the rigid outer tube member and the rigid inner tube member, and having an outer peripheral portion and a convexity formed on the outer peripheral portion, the convexity extending outward, disposed at a position corresponding to the radial through concavity of the rigid outer tube member, and fitted into the radial through concavity to project outward from the outer peripheral portion of the rigid outer tube member.

In a third aspect of the present invention, the radiator support according to the first or second aspect of the present invention is modified as follows:

the rigid outer tube member has a flange having a top surface, a bottom surface, and an axial through concavity formed in an axial direction thereof, the bottom surface seating on the top surface of the vehicle-side installation member; and the rubber-elastic member has a rubber flange having a top surface, a bottom surface, and a convexity formed on the bottom surface, the bottom surface superimposed on the top surface of the flange of the rigid outer tube member, the convexity extending downward, disposed at a position corresponding to the axial through concavity of the rigid outer tube member, and fitted into the axial through concavity to project downward from the bottom surface of the flange of the rigid outer tube member.

In the first aspect of the present invention, the radiator support is constructed by the rigid outer tube member, the rigid inner tube member, and the rubber-elastic member disposed between the rigid outer tube member and the rigid inner tube member. Moreover, the rigid inner tube member has the radial through concavity formed through the inner peripheral portion in a radial direction thereof, and the rubber-elastic member has the convexity formed on the inner peripheral portion at a position corresponding to the radial through concavity. The convexity extends inward so that it is fitted into the radial through concavity of the rigid inner tube member to project inward from the inner peripheral portion of the rigid inner tube member to the inner space thereof.

In the first aspect of the present invention, there is provided an engagement clearance between the radiator-side engagement pin and the rigid inner tube member so that the engagement pin can be fitted into the rigid inner tube member with ease. With the engagement pin thus fitted into the rigid inner tube member, the outer peripheral surface of the engagement pin can be brought into contact with the inwardly-extending convexity of the rubber-elastic member, convexity which projects from the inner peripheral portion of the rigid inner tube member to the inner space thereof. The contacting action and the elastically-deforming action of the inwardly-extending convexity can inhibit the rattling movements between the engagement pin and the rigid inner tube member, movements which result from the engagement clearance.

Hence, in accordance with the first aspect of the present invention, it is possible to inhibit the radiator support from coming off from the radiator even when the radiator with the radiator support installed is transported. In addition, it is possible to inhibit the abnormal noises, caused by the engagement pin and the rigid inner tube member which are brought into contact with each other, from generating when a vehicle is driven.

As described above, in the first aspect of the present invention, the radial through concavity is formed in the rigid inner tube member, and the inwardly-extending convexity of the rubber-elastic member is fitted into the radial through concavity. The convexity is projected from the inner peripheral portion of the rigid inner tube member to the inner space thereof. Thus, even when the rigid inner tube member is made from a resinous material, it is possible to manufacture a radiator support according to the first aspect of the present invention with ease.

For instance, a radiator support according to the first aspect of the present invention can be manufactured in the following manner: the rubber-elastic member is molded in advance, and is set in a mold for molding the rigid inner tube member with a resinous material. Into the mold with the rubber-elastic member disposed therein, a resinous material is injected to mold the rigid inner tube member. Accordingly, the radial through concavity can be molded simultaneously with the molding of the rigid inner tube member, and at the same time the inwardly-extending convexity of the rubber-elastic member can be projected from the resultant radial through concavity. On the other hand, it is possible to think of enclosing an entire rigid inner tube member by a rubber-elastic member in order to absorb the deviations of the center in the engagement pin of the radiator from the center in the rigid inner tube member, or to absorb the dimensional tolerances of the engagement pin and the rigid inner tube member. Compared with the imaginary manufacturing process, a radiator support according to the first aspect of the present invention can be manufactured much more readily.

In the first aspect of the present invention, a plurality of the inwardly-extending convexities and a plurality of the radial through concavities can be formed, and they can preferably be arranged at predetermined intervals in the circumferential direction of the rubber-elastic member and the rigid inner tube member, respectively. If such is the case, a plurality of the inwardly-extending convexities can absorb the rattling movements between the rigid inner tube member and the engagement pin effectively, and can position the engagement pin with respect to the center of the rigid inner tube member precisely.

In addition, in the first aspect of the present invention, the inwardly-extending convexity can preferably be formed parallel to the axial center line of the rigid inner tube member so that it is provided with a major dimension longitudinally.

In the second aspect of the present invention as well, the radiator support is constructed by the rigid outer tube member, the rigid inner tube member, and the rubber-elastic member disposed between the rigid outer tube member and the inner tube member. However, in the second aspect of the present invention, the rigid inner tube member is free from the radial through concavity; but the rigid outer tube member has the radial through concavity formed through the outer peripheral portion in a radial direction thereof; and the rubber-elastic member has the convexity formed on the outer peripheral portion at a position corresponding to the radial through concavity. The convexity extends outward so that it is fitted into the through concavity of the rigid outer tube member to project outward from the outer peripheral portion of the rigid outer tube member.

In the second aspect of the present invention, there is provided an engagement clearance between the engagement hole of the vehicle-side installation member and the rigid outer tube member so that the rigid outer tube member can be fitted into the engagement hole with ease. With the rigid outer tube member thus fitted into the engagement hole, the inner peripheral surface of the engagement hole can be brought into contact with the outwardly-extending convexity of the rubber-elastic member, convexity which projects from the outer peripheral portion of the rigid outer tube member. The contacting action and the elastically-deforming action of the outwardly-extending convexity can effectively inhibit the rattling movements between the rigid outer tube member and the engagement hole, movements which result from the engagement clearance.

Hence, in accordance with the second aspect of the present invention, it is possible to inhibit the abnormal noises, which result from the rattling movements between the rigid outer tube member and the engagement hole, from generating when a vehicle is driven.

For instance, a radiator support according to the second aspect of the present invention can be manufactured in the following manner: when the rigid outer tube member is made from a resinous material, the rubber-elastic member is molded in advance, and is set in a mold for molding the rigid outer tube member. Into the mold with the rubber-elastic member disposed therein, a resinous material is injected to mold the rigid outer tube member. Accordingly, the radial through concavity can be molded simultaneously with the molding of the rigid outer tube member, and at the same time the outwardly-extending convexity of the rubber-elastic member can be projected from the resultant radial through concavity. Compared with an imaginary case where an entire rigid outer tube member is enclosed by a rubber-elastic member, a radiator support according to the second aspect of the present invention can be manufactured much more readily.

In the second aspect of the present invention as well, a plurality of the outwardly-extending convexities and a plurality of the radial through concavities can be formed, and they can preferably be arranged at predetermined intervals in the circumferential direction of the rubber-elastic member and the rigid outer tube member, respectively. Likewise, the outwardly-extending convexity and the radial through concavity can preferably be formed to have a configuration which is provided with a major dimension longitudinally.

In the radiator support according to the third aspect of the present invention, the rigid outer tube member of the radiator support according to the first or second aspect of the present invention further has the outwardly-extending flange, and the rubber-elastic member thereof further has the outwardly-extending rubber flange. Moreover, the flange of the rigid outer tube member has the axial through concavity, and the rubber flange of the rubber-elastic member has the downwardly-extending convexity disposed at a position corresponding to the axial through concavity of the rigid outer tube member.

In accordance with the third aspect of the present invention, by way of the downwardly-extending convexity formed on the rubber flange of the rubber-elastic member, the flange of the rigid outer tube member can be seated elastically on a top surface of the vehicle-side installation member.

In the third aspect of the present invention as well, a plurality of the downwardly-extending convexities and a plurality of the axial through concavities can be formed, and they can preferably be arranged at predetermined intervals in the circumferential direction of the rubber-elastic member and the rigid outer tube member, respectively.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure:

FIG. 1 (B) illustrates a perspective view of the radiator support;

FIG. 3 (A) illustrates a side view of the radiator support illustrated in FIG. 1 partially in cross-section, and taken along the line "3 (A)"—"3 (A)" of FIG. 3 (C);

FIG. 3 (B) illustrates a cross-sectional view of the radiator support illustrated in FIG. 1, and taken along the line "3 (B)"—"3 (B)" of FIG. 3 (C);

Fig. 3 (C) illustrates a bottom view of the radiator support illustrated in FIG. 1;

FIG. 4 (B) illustrates a partially cut-away perspective view of an independent rubber-elastic member of the radiator support illustrated in FIGS. 1 through 3;

FIG. 5 (B) illustrates a bottom view of the rubber-elastic member illustrated in FIG. 4 (B);

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

The present invention will be hereinafter described in detail with reference to a radiator support according to a preferred embodiment of the present invention.

Figure 1:
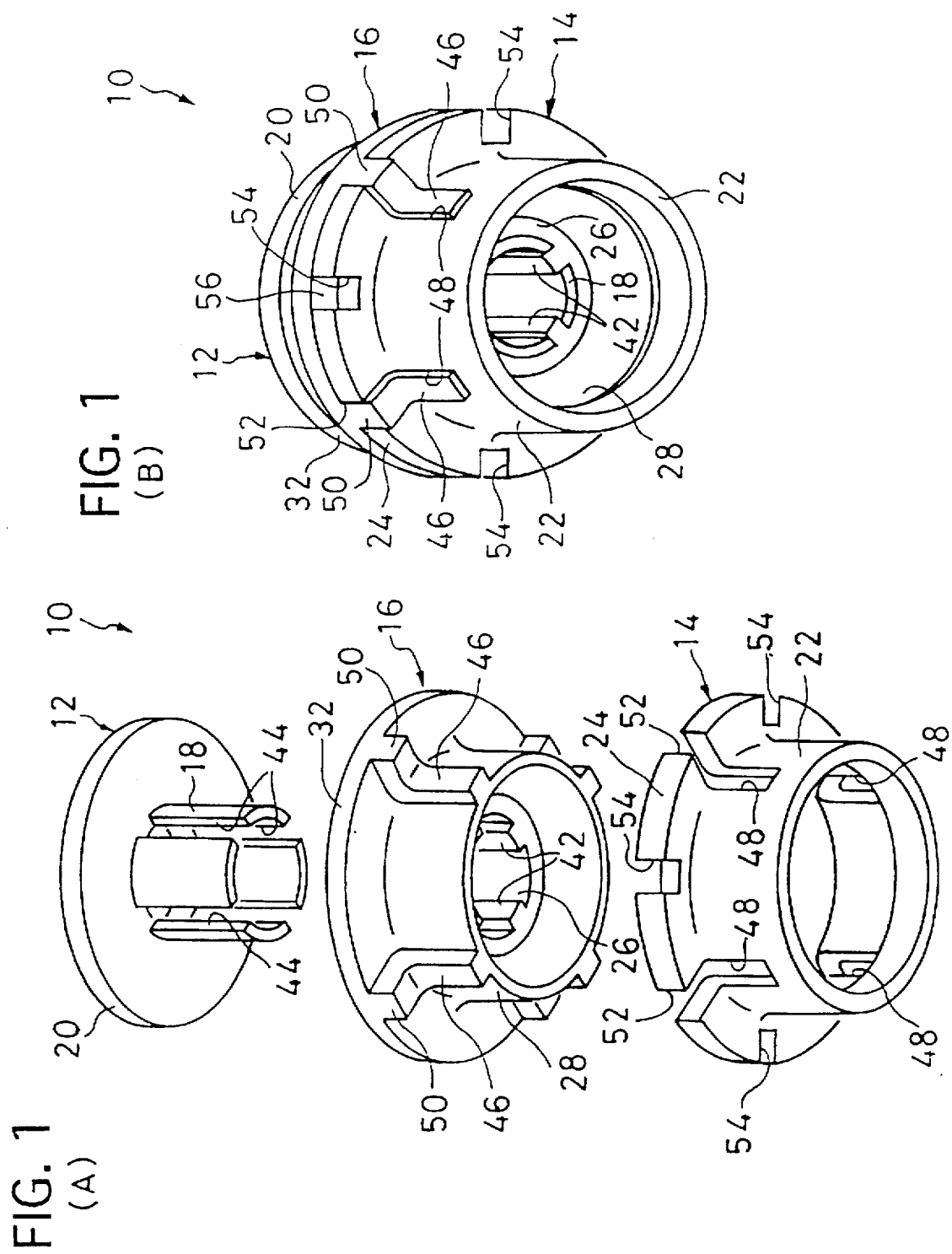
FIG. 1 (A) illustrates an exploded view of a radiator support according to a preferred embodiment of the present invention.
Figure 4:
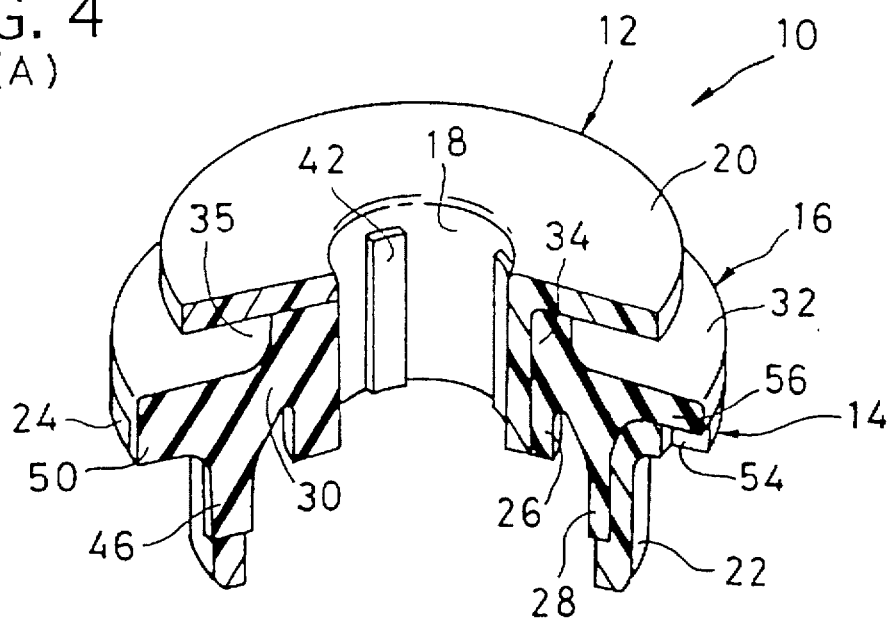
FIG. 4 (A) illustrates a partially cut-away perspective view of the radiator support illustrated in FIGS. 1 through 3.
Figure 4:
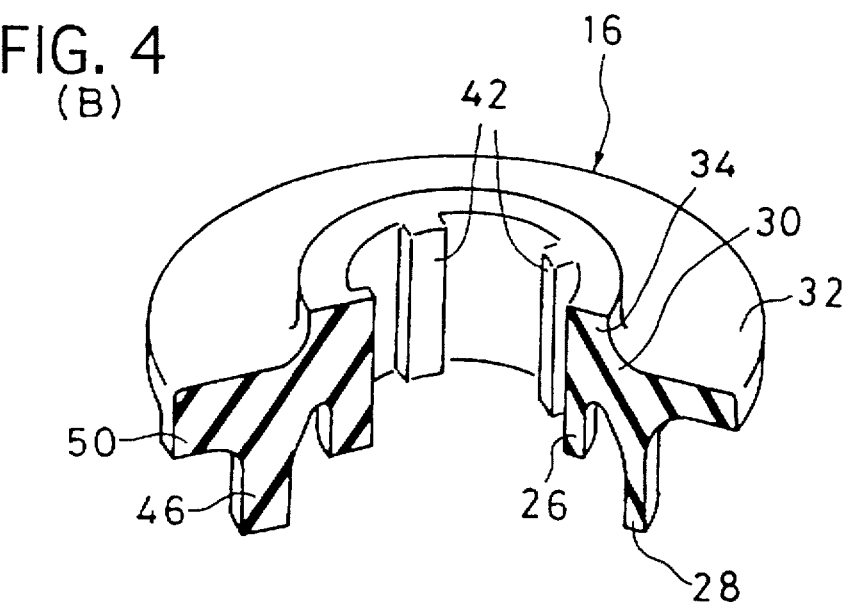
Figure 5:
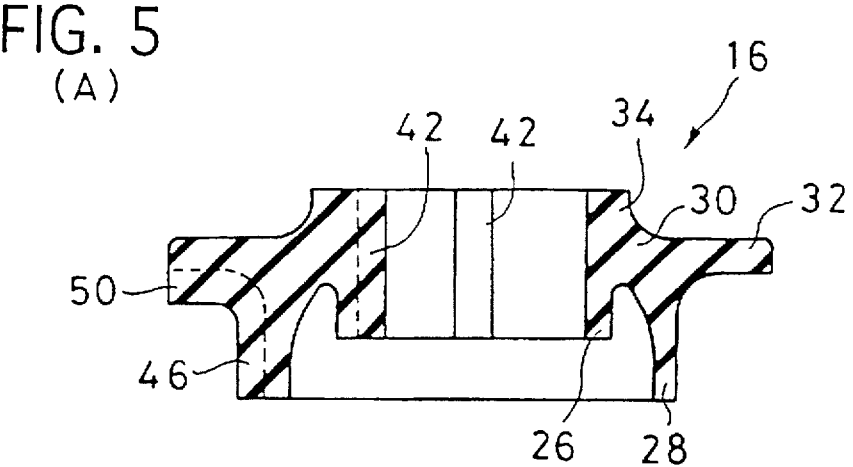
FIG. 5 (A) illustrates a cross-sectional view of the rubber-elastic member illustrated in FIG. 4 (B), and taken along the line "5 (A)"—"5 (A)" of FIG. 5 (B)
Figure 5:
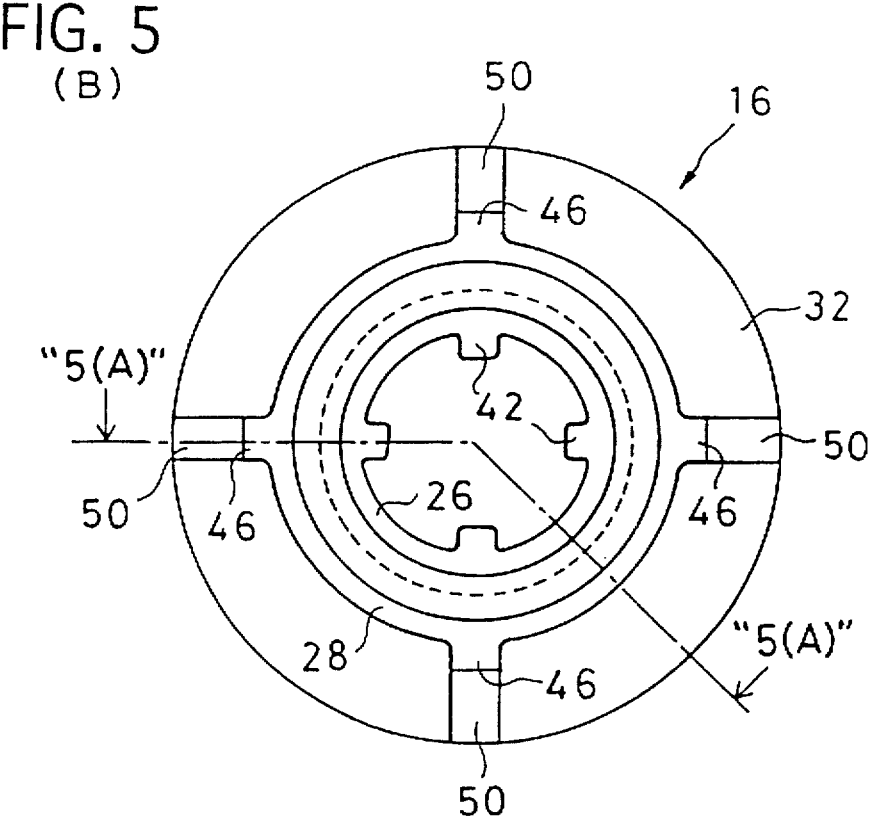

In FIGS. 1, 3 and 4, the radiator support is designated at 10, and includes a rigid inner tube member 12 made from a resin, a rigid outer tube member 14 made from a resin, and an intermediate rubber-elastic member 16. In this preferred embodiment, both of the rigid inner tube member 12 (hereinafter abbreviated to "inner tube member 12") and the rigid outer tube member 14 (hereinafter abbreviated to "outer tube member 14") are made from a polyamide resin (PA). The rubber-elastic member 16 is disposed between the inner tube member 12 and the outer tube member 14 to connect them, and is made from a natural rubber (NR).

As illustrated in FIG. 1 (A), the inner tube member 12 has a cylinder-shaped portion 18, and a flange 20. The flange 20 is disposed at the top end of the cylinder-shaped portion 18, and extends outwardly in radial directions.

The outer tube member 14 has a cylinder-shaped portion 22, and a flange 24. The cylinder-shaped portion 22 has an inside diameter larger than an outside diameter of the cylinder-shaped portion 18 of the inner tube member 12. The flange 24 is disposed at the top end of the cylinder-shaped portion 22, and extends outwardly in radial directions.

The rubber-elastic member 16 has an inner cylinder-shaped portion 26, an outer cylinder-shaped portion 28, and an intermediate portion 30 (shown in FIGS. 3 (A) and 3 (B)). The inner cylinder-shaped portion 22 is formed so as to surround the cylinder-shaped portion 18 of the inner tube member 12. The outer cylinder-shaped tube portion 28 is formed so as to be placed inside the cylinder-shaped portion 22 of the outer tube member 14. The intermediate portion 30 works as a connector for connecting the inner cylinder-shaped portion 26 and the outer cylinder-shaped portion 28. Note that, as illustrated in FIGS. 3 (A) and 3 (B), the intermediate portion 30 is inclined upwardly from the outer peripheral side to the inner peripheral side.

Further, the rubber-elastic member 16 has a radially-outwardly extending rubber flange 32, and an upwardly-extending projection 34 (shown in FIGS. 3 (A) and 3 (B)). The upwardly-extending projection 34 is disposed on an inner peripheral side of the rubber-elastic member 16, and projects upwardly. When the rubber flange 32 is superimposed on a top surface of the flange 24 of the outer tube member 14, the top end of the upwardly-extending projection 34 is brought into contact with the bottom surface of the flange 20 of the inner tube member 12. Note that, as illustrated in FIGS. 3 (A) and 3 (B), there is formed an annular clearance 35 between the flange 20 of the inner tube member 20 and the rubber flange 32 of the rubber-elastic member 16.

Furthermore, as illustrated in FIGS. 4 (A) and 4 (B), the rubber-elastic member 16 has a plurality of inwardly-extending convexities 42 formed integrally on the inner peripheral surface of the inner cylinder-shaped portion 26. The inwardly-extending convexities 42 stretch over the entire height of the inner peripheral surface of the inner cylinder-shaped portion 26 of the rubber-elastic member 16, and project from the inner peripheral surface of the inner tube member 12 to the inner space thereof by a predetermined dimension via a plurality of slit-shaped cut-offs 44 (shown in FIG. 1 (A)). The slit-shaped cut-offs 44 are formed in the inner tube member 12 at positions corresponding to the inwardly-extending convexities 42 of the rubber-elastic member 16, and work as the above-described through concavity.

As illustrated in FIG. 3 (C), the inwardly-extending convexities 42 and the slit-shaped cut-offs 44 are formed at four positions in the circumferential direction of the rubber-elastic member 16 and the inner tube member 12, respectively. Note that the four positions are spaced equally at intervals of 90 degrees.

Moreover, as illustrated in FIG. 1 (A), and FIGS. 4 (A) and 4 (B), the rubber-elastic member 16 has a plurality of outwardly-extending convexities 46 formed integrally on the outer peripheral surface of the outer cylinder-shaped portion 28. The outwardly-extending convexities 46 project outwardly from the outer peripheral surface of the outer cylinder-shaped portion 28, and further project from the outer peripheral surface of the outer tube member 14 by a predetermined dimension via a plurality of slit-shaped cut-offs 48 (shown in FIGS. 1 (A) and 1 (B)). The slit-shaped cut-offs 48 are formed in the outer tube member 14 at positions corresponding to the outwardly-extending convexities 46 of the rubber-elastic member 16.

As illustrated in FIG. 3 (C), the outwardly-extending convexities 46 and the slit-shaped cut-offs 48 are formed at four positions in the circumferential direction of the rubber-elastic member 16 and the outer tube member 14, respectively. Note that the four positions are spaced equally at intervals of 90 degrees.

In addition, as illustrated in FIG. 1 (A), and FIGS. 3 (A), 3 (B) and 3 (C), the rubber-elastic member 16 has a plurality of downwardly-extending convexities 50 formed integrally on the bottom surface of the rubber flange 32. The downwardly extending convexities 50 project downwardly from the bottom surface of the flange 24 of the outer tube member 14 by a predetermined dimension via a plurality of cutoffs 52 (shown in FIGS. 1 (A) and 1 (B)). The cut-offs 52 are formed in the flange 24 of the outer tube member 14 at positions corresponding to the downwardly-extending convexities 50 of the rubber-elastic member 16.

Note that, as illustrated in FIG. 1 (A), a plurality of the downwardly-extending convexities 50 and the cut-offs 52 are formed continuously from the outwardly-extending convexities 46 and the slit-shaped cut-offs 48, respectively.

As illustrated in FIGS. 1 (A) and 1 (B), and FIG. 3 (C), in the radiator support 10 according to a preferred embodiment of the present invention, the outer tube member 14 further has four cut-offs 54 in the flange 24. The cut-offs 54 are placed respectively at four positions between the cut-offs 52 into which the downwardly extending convexities 50 are fitted. Note that the four positions are spaced equally at intervals of 90 degrees in the circumferential direction. The cut-offs 54 are formed as a rectangle in a planar configuration, and have a shallow depth: namely; they have a radial depth which does not reach the outer peripheral end of the cylinder-shaped portion 22. Thus, the bottom surface of the rubber flange 32 of the rubber-elastic member 16 is exposed downwardly at portions corresponding to the cut-offs 54 of the outer tube member 14. The portions of the rubber flange 32 corresponding to the cut-offs 54 work as holdable ends 56 which can be held by mold halves during the injection molding of the inner tube member 12 and the outer tube member 14 described later.

Figure 2:
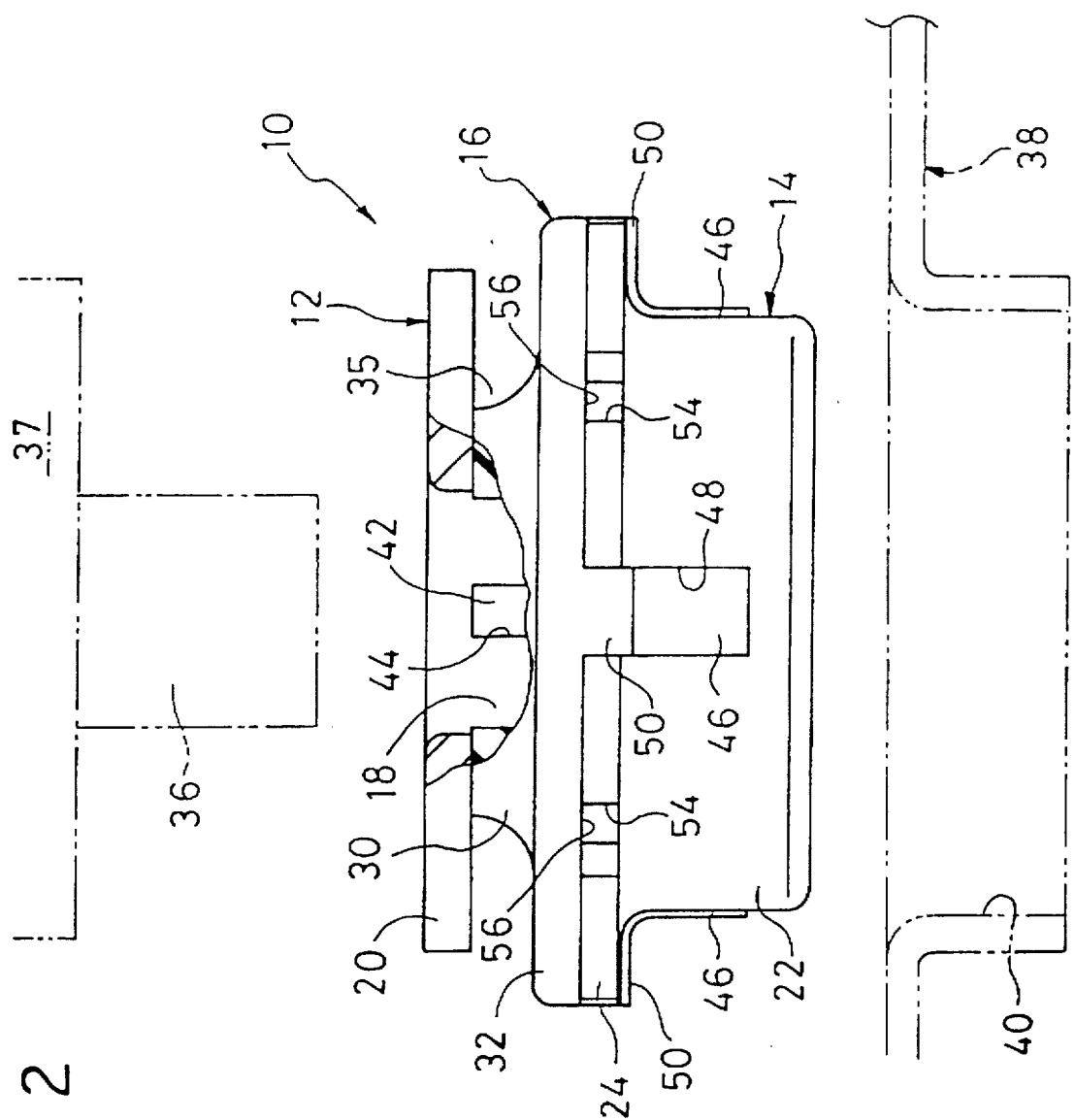
FIG. 2 is external view of the radiator support illustrated in FIG. 1 together with mating members to be assembled therewith.

The radiator support 10 according to a preferred embodiment of the present invention is assembled between a vehicle-side installation member 38 and a radiator 37 in the following manner: namely; as illustrated in FIG. 2, a downwardly-extending engagement pin 36 of the radiator 37 is fitted into the inner tube member 12; and the outer tube member 14 is fitted into an engagement hole 40 of the vehicle-side installation member 38. In this example, the engagement pin 36 is made from a resin, and the vehicle-side installation member 38 is made from a metal.

The thus assembled radiator support 10 absorbs the vertical relative displacements between the radiator 37 and the vehicle-side installation member 38 mainly by the vertical shearing elastic deformations of the intermediate member 30 in the rubber-elastic member 16.

The vertical relative displacements can be received securely by the annular clearance 35 which is formed between the flange 20 of the inner tube member 12 and the rubber flange 32 of the rubber-elastic member 16. When the magnitude of the vertical relative displacements is a predetermined value or more, the flange 20 of the inner tube member 12, and the rubber flange 32 of the rubber-elastic member 16 are brought into contact with each other to inhibit the excessive deformations of the intermediate member 30 in the rubber-elastic member 16. Thus, the rubber flange 32 works as a stopper for inhibiting the vertical relative displacements from enlarging excessively.

The radiator support 10 according to a preferred embodiment of the present invention can be readily manufactured in the following manner: namely; the rubber-elastic member 16 is molded independently in advance, and set in a mold for molding the inner tube member 12 and the outer tube member 14; and the inner tube member 12 and the outer tube member 14 are injection-molded by injecting a resinous material into the mold with the rubber-elastic member 16 set therein.

Figure 6:
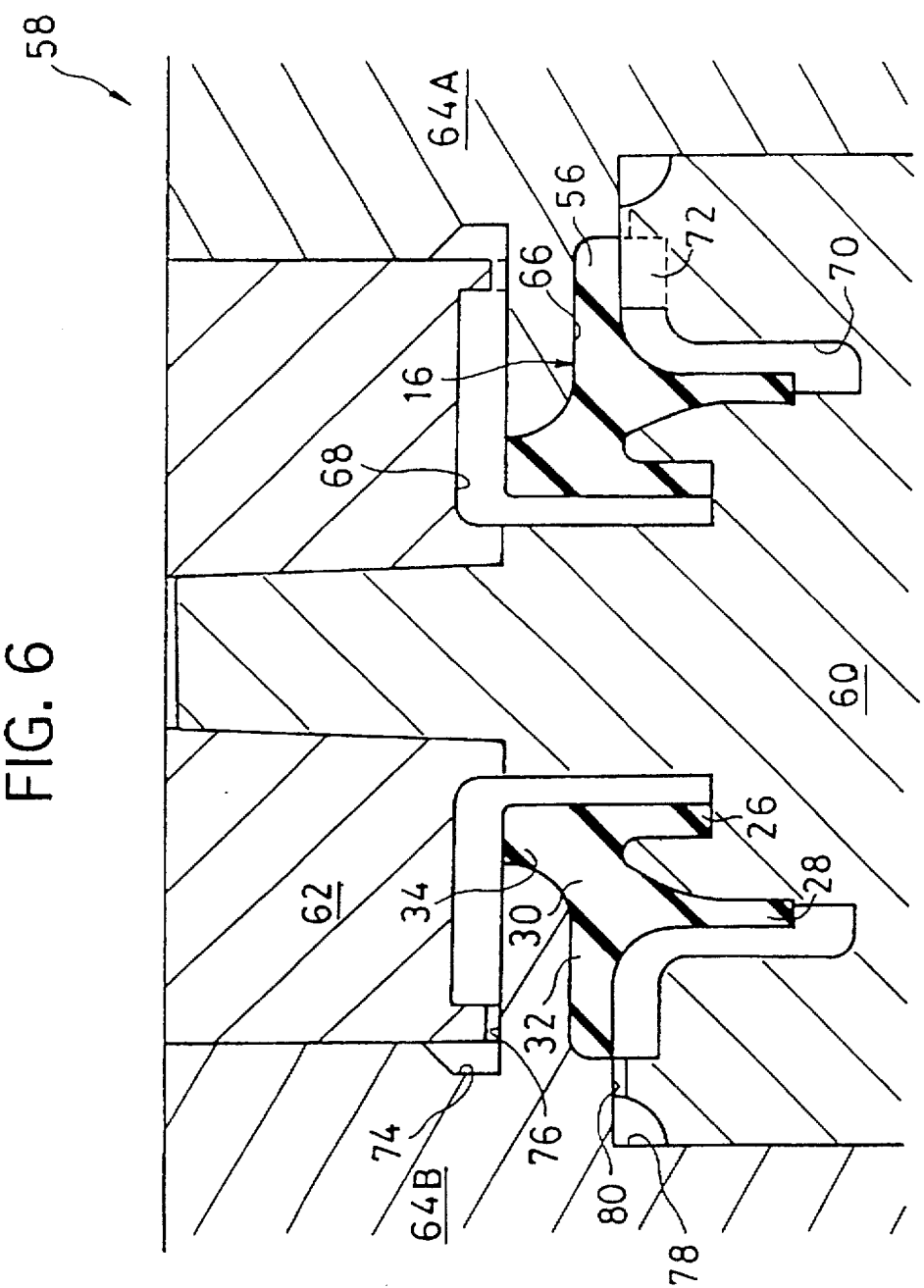
FIG. 6 illustrates a process for manufacturing the radiator support illustrated in FIGS. 1 through 3.

FIG. 6 illustrates the manufacturing process of the radiator support 10 specifically. In the drawing, a mold for molding a resinous product is designated at 58. The mold 58 includes an upper mold half 62, a lower mold half 60, a right-hand-side split mold 64A, and a left-hand-side split mold 64B. Moreover, in the mold 58, there are formed a space 66 for setting the rubber-elastic member 16, a cavity 68 for molding the inner tube member 12, and a cavity 70 for molding the outer tube member 14.

The space 66 for setting the rubber-elastic member 16, the cavity 68 for molding the inner tube member 12, and the cavity 70 for molding the outer tube member 14 are spaces which are communicated with each other. Moreover, the lower mold half 60 is provided with grips 72. The grips 72 hold the holdable ends 56 of the rubber-elastic member 16 cooperatively with the right-hand-side and left-hand-side split molds 64A and 64B. Note that the grips 72 have the same configuration as that of the cut-offs 54 of the outer tube member 14.

In this exemplary manufacturing process, the rubber-elastic member 16 is subjected to an adhesive application in advance, and is set in the space 66. When the rubber-elastic member 16 is set, the rubber-elastic member 16 is held at the holdable ends 56 by the right-hand-side and left-hand-side split molds 64A and 64B, and by the grips 72 of the lower mold half 60. Thus, the rubber-elastic member 16 is kept cramped at a fixed position.

Under the aforementioned circumstance, a molten resinous material is injected into the space 68 by way of a passage 74 and a gate 76, and is injected into the space 70 by way of an annular passage 78 and a gate 80 as well. The inner tube member 12 and the outer tube member 14 are molded by curing the molten resinous material, and are simultaneously integrated with the rubber-elastic member 16. Thus, the radiator support 10 can be prepared with ease.

When the inner tube member 12, and the outer tube member 14 are molded, the slit-shaped cut-offs 44, 48, and 52 are molded simultaneously. As a result, the inwardly-extending convexities 42, the outwardly-extending convexities 46, and the downwardly-extending convexities 50 of the rubber-elastic member 16 can be projected respectively from the cut-offs 44, 48, and 52 inwardly, outwardly, and downwardly.

In the radiator support 10 according to a preferred embodiment of the present invention, the inwardly-extending convexities 42 of the rubber-elastic member 16 are projected from the inner peripheral surface of the inner tube member 12 to the inner space thereof. Accordingly, a predetermined engagement clearance can be provided between the inner tube member 12 and the engagement pin 36 of the radiator 37 so that the engagement pin 36 and the inner tube member 12 can be assembled in favorable engagement. At the same time, the inwardly-extending elastic convexities 42 can be brought into with the engagement pin 36. As a result, the rattling movements between the engagement pin 36 and the inner tube member 12 can be absorbed by the contacting action and the elastically-deforming action of the inwardly-extending convexities 42. Hence, when driving a vehicle, the abnormal noises, caused by the rattling movements, can be inhibited from generating.

Likewise, in the radiator support 10 according to a preferred embodiment of the present invention, the outwardly-extending convexities 46 of the rubber-elastic member 16 are projected from the outer peripheral surface of the outer tube member 14. Accordingly, a predetermined engagement clearance can be provided between the outer tube member 14 and the engagement hole 40 of the vehicle-side installation member 38 so that the outer tube member 14 and the engagement hole 40 can be assembled in favorable engagement. At the same time, the outwardly-extending elastic convexities 46 can be elastically brought into with the inner peripheral surface of the engagement hole 40. As a result, the rattling movements between the engagement hole 40 and the outer tube member 14 can be suppressed by the elastically-deforming action of the outwardly-extending convexities 46. Hence, when driving a vehicle, the abnormal noises, caused by the rattling movements, can be further inhibited from generating.

Moreover, the downwardly-extending convexities 50 are formed on the rubber flange 32 of the rubber-elastic member 16 so that they project downward through the cut-offs 52 in the flange 24 of the outer tube member 14. Thus, the radiator support 10 can be elastically brought into contact with the top surface of the vehicle-side installation member via the downwardly-extending convexities 52.

In addition, the radiator support 10 according a preferred embodiment of the present invention can be manufactured with ease: namely; the rubber-elastic member 16 is molded in advance, and is set in the mold 58 for molding a resinous product; and a resinous material is injected into the mold 58 with the rubber-elastic member 16 set therein.

Specifically, the inwardly-extending convexities 42 of the rubber-elastic member 16 are arranged so that they project inward through the slit-shaped cut-offs 44 formed in the inner tube member 12; the outwardly-extending convexities 46 are arranged so that they project outward through the slit-shaped cut-offs 48 of the outer tube member 14; and the downwardly-extending convexities 50 are arranged so that they project downward through the slit-shaped cut-offs 52 of the outer tube member 14. Accordingly, by molding the rubber-elastic member 16 in advance, and molding the inner tube member 12 and the outer tube member 14 with the mold 58 in which the rubber-elastic member 16 is simply set, the radiator support 10 can be readily provided with the inwardly-extending convexities 42 which can be brought into contact with the outer peripheral surface of the engagement pin 36 of the radiator 37; it can be readily provided with the outwardly-extending convexities 46 which can be brought into contact with the inner peripheral surface of the engagement hole 40 of the vehicle-side installation member 38; and it can be readily provided with the downwardly-extending convexities 50 which can be brought into contact with the top surface of the vehicle-side installation member 38.

In particular, the outer tube member 14 is provided with a plurality of the cutoffs 54 which are disposed at appropriate positions in the flange 24 along the circumferential direction. Note that, in the radiator support 10 according to a preferred embodiment of the present invention, the cut-offs 54 are disposed at four positions independently. At the cut-offs 54, the rubber flange 32 of the rubber-elastic member 16 can be held by the mold 58 for molding a resinous product. Specifically, at the holdable ends 56, the rubber-elastic member 16 is held and kept from moving in the mold 58. As a result, when a resinous material is injected with a high pressure to mold the inner tube member 12 and the outer tube member 14, the rubber-elastic member 16 can be inhibited from deforming by the injection pressure of the resinous material. Hence, not only the rubber-elastic member 16, but also the entire radiator support 10 can be molded satisfactorily.

Figure 7:
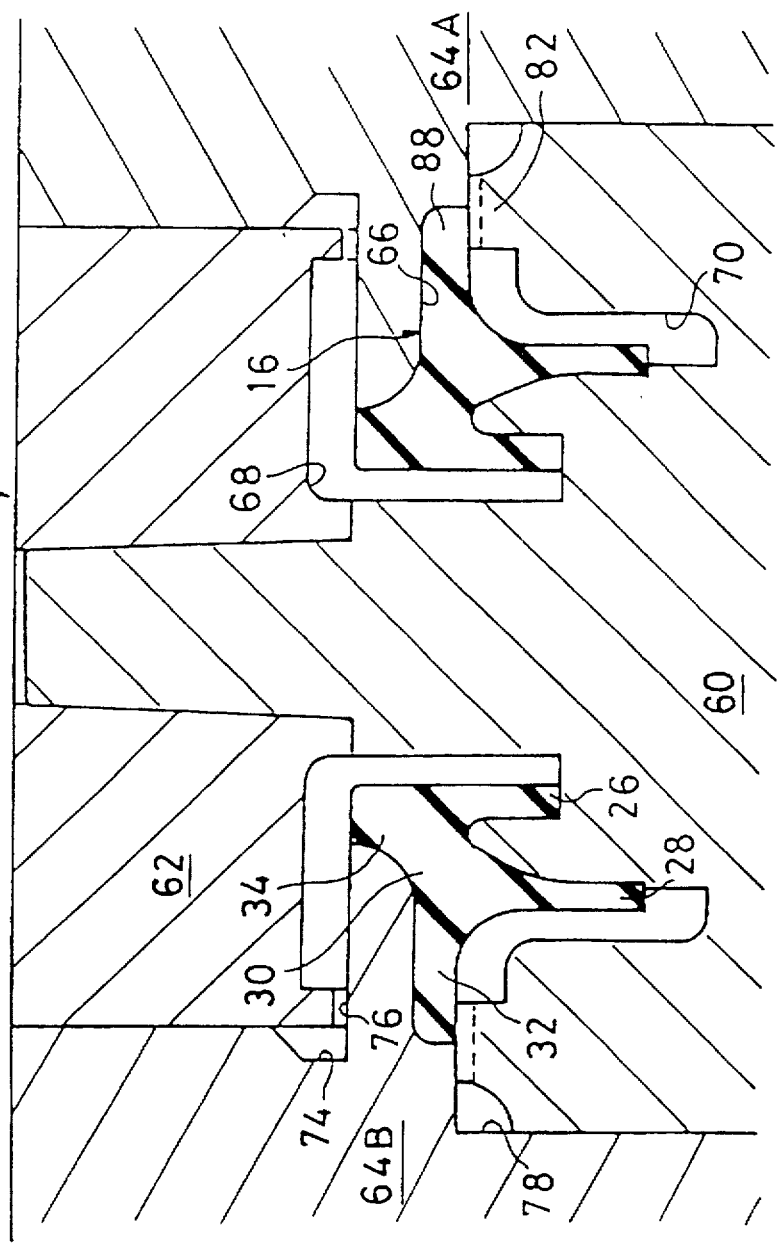
FIG. 7 illustrates another process for manufacturing the radiator support illustrated in FIGS. 1 through 3, another process which differs from the process illustrated in FIG. 6.
Figure 8:
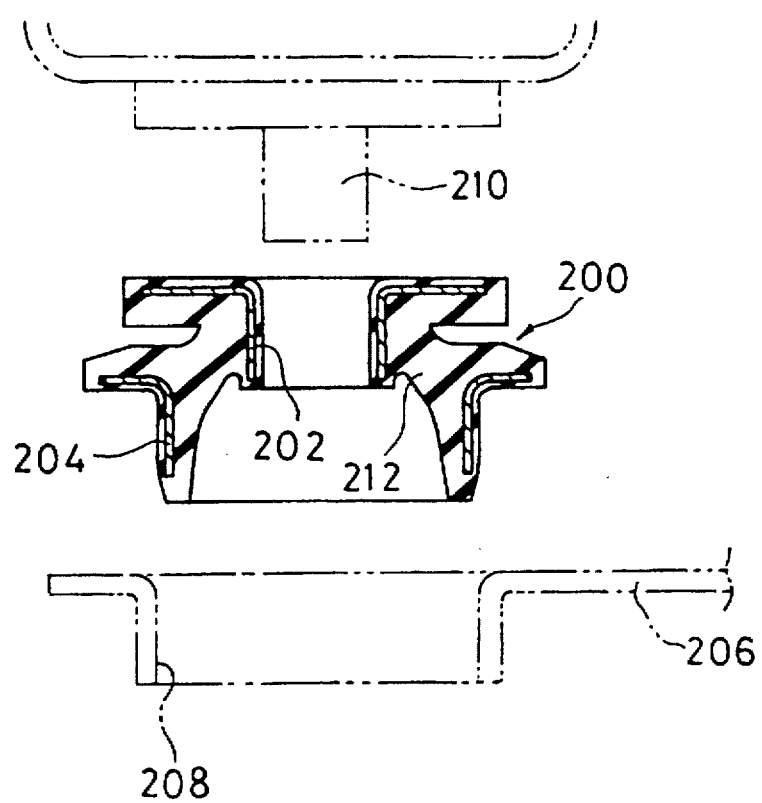
FIG. 8 illustrates a cross-sectional view of one of the conventional radiator supports together with mating members to be assembled therewith.

As described above, in the radiator support 10 according to a preferred embodiment of the present invention, the cut-offs 54 are disposed independently at a plurality of positions in the flange 24 of the outer tube member 14 along the circumferential direction; the holdable ends 56 are disposed at positions, corresponding to the cut-offs 54, in the rubber flange 32 of the rubber-elastic member 16; and the rubber-elastic member 16 are held by the mold 58. This arrangement can be modified as illustrated in FIG. 7: namely; the lower mold 60 can be provided with a holding member 82 which is formed all around the outer periphery of the cavity 70 for molding the outer tube member 14; the rubber-elastic member 16 can be provided with a holdable end 84 which is formed all around the outer periphery of the rubber flange 32; and the holdable end 84 can be held by the holding member 82 of the lower mold 60, and cooperatively by the right-hand-side and left-hand-side split molds 64A and 64B.

Having now fully described the present invention, it will be apparent to one of ordinary skill in the art that many changes and modifications can be made thereto without departing from the spirit or scope of the present invention as set forth herein including the appended claims.

What is claimed is:

1. A radiator support disposed between a radiator having an engagement pin and a vehicle-side installation member having an engagement hole and a top surface, and comprising:

a rigid outer tube member fitted into the engagement hole of said vehicle-side installation member;

a rigid inner tube member fitted around the engagement pin of said radiator, and having an inner peripheral portion, an inner space disposed inside the inner peripheral portion, and a radial through concavity formed through the inner peripheral portion in a radial direction thereof; and a rubber-elastic member disposed between said rigid outer tube member and said rigid inner tube member, and having an inner peripheral portion and a convexity formed on the inner peripheral portion, the convexity extending inward, disposed at a position corresponding to the radial through concavity of said rigid inner tube member, and fitted into the radial through concavity to project inward from the inner peripheral portion of said rigid inner tube member to the inner space thereof.

2. The radiator support according to claim 1, wherein:

said rigid inner tube member has a plurality of the radial through concavities; and said rubber-elastic member has a plurality of the inwardly-extending convexities.

3. The radiator support according to claim 2, wherein:

said plurality of the radial through concavities are arranged at predetermined intervals in a circumferential direction of said rigid inner tube member; and said plurality of the inwardly-extending convexities are arranged at predetermined intervals in a circumferential direction of said rubber-elastic member.

4. The radiator support according to claim 1, wherein the radial through concavity of said rigid inner tube member, and the inwardly-extending convexity of said rubber-elastic member are formed to have a configuration which have a major dimension longitudinally along an axial center line thereof.

5. The radiator support according to claim 1, wherein:

said rigid outer tube member has a flange having a top surface, a bottom surface, and an axial through concavity formed in an axial direction thereof, the bottom surface seating on the top surface of said vehicle-side installation member; and said rubber-elastic member has a rubber flange having a top surface, a bottom surface, and a convexity formed on the bottom surface, the bottom surface superimposed on the top surface of the flange of said rigid outer tube member, the convexity extending downward, disposed at a position corresponding to the axial through concavity of said rigid outer tube member, and fitted into the axial through concavity to project downward from the bottom surface of the flange of said rigid outer tube member.

6. The radiator support according to claim 5, wherein:

said rigid outer tube member has a plurality of the axial through concavities in the flange; and said rubber-elastic member has a plurality of the downwardly-extending convexities on the bottom surface of the rubber flange.

7. The radiator support according to claim 6, wherein:

said plurality of the axial through concavities are arranged at predetermined intervals in a circumferential direction of the flange; and said plurality of the downwardly-extending convexities are arranged at predetermined intervals in a circumferential direction of the rubber flange.

8. The radiator support according to claim 5, wherein said rigid outer tube member has a cut-off in the flange, the cut-off exposing a portion of the bottom surface of the rubber flange of the rubber-elastic member.

9. The radiator support according to claim 8, wherein said rigid outer tube member has a plurality of the cut-offs in the flange.

10. The radiator support according to claim 9, wherein said plurality of the cut-offs are arranged at predetermined intervals in a circumferential direction of the flange.

11. The radiator support according to claim 1, wherein;

said rigid inner tube member, and said rigid outer tube member are made from a polyamide resin; and said rubber-elastic member is made from a natural rubber.

12. A radiator support disposed between a radiator having an engagement pin and a vehicle-side installation member having an engagement hole and a top surface, and comprising:

a rigid outer tube member fitted into the engagement hole of said vehicle-side installation member, and having an outer peripheral portion, and a radial through concavity formed through the outer peripheral portion in a radial direction thereof;

a rigid inner tube member fitted around the engagement pin of said radiator; and a rubber-elastic member disposed between said rigid outer tube member and said rigid inner tube member, and having an outer peripheral portion and a convexity formed on the outer peripheral portion, the convexity extending outward, disposed at a position corresponding to the radial through concavity of said rigid outer tube member, and fitted into the radial through concavity to project outward from the outer peripheral portion of the rigid outer tube member.

13. The radiator support according to claim 12, wherein:

said rigid outer tube member has a plurality of the radial through concavities; and said rubber-elastic member has a plurality of the outwardly-extending convexities.

14. The radiator support according to claim 13, wherein:

said plurality of the radial through concavities are arranged at predetermined intervals in a circumferential direction of said rigid outer tube member; and said plurality of the outwardly-extending convexities are arranged at predetermined intervals in a circumferential direction of said rubber-elastic member.

15. The radiator support according to claim 12, wherein the radial through concavity of said rigid outer tube member, and the outwardly-extending convexity of said rubber-elastic member are formed to have a configuration which have a major dimension longitudinally along an axial center line thereof.

16. The radiator support according to claim 12, wherein:

said rigid outer tube member has a flange having a top surface, a bottom surface, and an axial through concavity formed in an axial direction thereof, the bottom surface seating on the top surface of said vehicle-side installation member; and said rubber-elastic member has a rubber flange having a top surface, a bottom surface, and a convexity formed on the bottom surface, the bottom surface superimposed on the top surface of the flange of said rigid outer tube member, the convexity extending downward, disposed at a position corresponding to the axial through concavity of said rigid outer tube member, and fitted into the axial through concavity to project downward from the bottom surface of the flange of said rigid outer tube member.

17. The radiator support according to claim 16, wherein:

said rigid outer tube member has a plurality of the axial through concavities in the flange; and said rubber-elastic member has a plurality of the downwardly-extending convexities on the bottom surface of the rubber flange.

18. The radiator support according to claim 17, wherein:

said plurality of the axial through concavities are arranged at predetermined intervals in a circumferential direction of the flange; and said plurality of the downwardly-extending convexities are arranged at predetermined intervals in a circumferential direction of the rubber flange.

19. The radiator support according to claim 16, wherein:

the axial through concavity of said rigid outer tube member is formed continuously from the radial through concavity thereof; and the downwardly-extending convexity of said rubber-elastic member is formed continuously from the outwardly-extending convexity thereof.

20. The radiator support according to claim 16, wherein said rigid outer tube member has a cut-off in the flange, the cut-off exposing a portion of the bottom surface of the rubber flange of the rubber-elastic member.

21. The radiator support according to claim 20, wherein said rigid outer tube member has a plurality of the cut-offs in the flange.

22. The radiator support according to claim 21, wherein said plurality of the cut-offs are arranged at predetermined intervals in a circumferential direction of the flange.

23. The radiator support according to claim 12, wherein;

said rigid inner tube member, and said rigid outer tube member are made from a polyamide resin; and said rubber-elastic member is made from a natural rubber.

24. A radiator support disposed between a radiator having an engagement pin and a vehicle-side installation member having an engagement hole and a top surface, and comprising:

a rigid outer tube member fitted into the engagement hole of said vehicle-side installation member, and having an outer peripheral portion, and a radial through concavity formed through the outer peripheral portion in a radial direction thereof;

a rigid inner tube member fitted around the engagement pin of said radiator, and having an inner peripheral portion, an inner space disposed inside the inner peripheral portion, and a radial through concavity formed through the inner peripheral portion in a radial direction thereof; and a rubber-elastic member disposed between said rigid outer tube member and said rigid inner tube member, and having an inner peripheral portion, a first convexity formed on the inner peripheral portion, an outer peripheral portion, and a second convexity formed on the outer peripheral portion, the first convexity extending inward, disposed at a position corresponding to the radial through concavity of said rigid inner tube member, and fitted into the radial through concavity to project inward from the inner peripheral portion of said rigid inner tube member to the inner space thereof, the second convexity extending outward, disposed at a position corresponding to the radial through concavity of said rigid outer tube member, and fitted into the radial through concavity to project outward from the outer peripheral portion of the rigid outer tube member.

25. The radiator support according to claim 24, wherein:

said rigid inner tube member has a plurality of the radial through concavities; and said rubber-elastic member has a plurality of the inwardly-extending first convexities.

26. The radiator support according to claim 24, wherein:

a plurality of the radial through concavities are arranged at predetermined intervals in a circumferential direction of said rigid inner tube member; and a plurality of the inwardly-extending first convexities are arranged at predetermined intervals in a circumferential direction of said rubber-elastic member.

27. The radiator support according to claim 24, wherein the radial through concavity of said rigid inner tube member, and the inwardly-extending first convexity of said rubber-elastic member are formed to have a configuration which have a major dimension longitudinally along an axial center line thereof.

28. The radiator support according to claim 24, wherein:

said rigid outer tube member has a plurality of the radial through concavities; and said rubber-elastic member has a plurality of the outwardly-extending second convexities.

29. The radiator support according to claim 28, wherein:

said plurality of the radial through concavities are arranged at predetermined intervals in a circumferential direction of said rigid outer tube member; and said plurality of the outwardly-extending second convexities are arranged at predetermined intervals in a circumferential direction of said rubber-elastic member.

30. The radiator support according to claim 24, wherein the radial through concavity of said rigid outer tube member, and the outwardly-extending second convexity of said rubber-elastic member are formed to have a configuration which have a major dimension longitudinally along an axial center line thereof.

31. The radiator support according to claim 24, wherein:

said rigid outer tube member has a flange having a top surface, a bottom surface, and an axial through concavity formed in an axial direction thereof the bottom surface seating on the top surface of said vehicle-side installation member; and said rubber-elastic member has a rubber flange having a top surface, a bottom surface, and a convexity formed on the bottom surface, the bottom surface superimposed on the top surface of the flange of said rigid outer tube member, the convexity extending downward, disposed at a position corresponding to the axial through concavity of said rigid outer tube member, and fitted into the axial through concavity to project downward from the bottom surface of the flange of said rigid outer tube member.

32. The radiator support according to claim 31, wherein:

said rigid outer tube member has a plurality of the axial through concavities in the flange; and said rubber-elastic member has a plurality of the downwardly-extending convexities on the bottom surface of the rubber flange.

33. The radiator support according to claim 32, wherein:
said plurality of the axial through concavities are arranged at predetermined intervals in a circumferential direction of the flange; and
said plurality of the downwardly-extending convexities are arranged at predetermined intervals in a circumferential direction of the rubber flange.

34. The radiator support according to claim 31, wherein:
the axial through concavity of said rigid outer tube member is formed continuously from the radial through concavity thereof; and
the downwardly-extending convexity of said rubber-elastic member is formed continuously from the outwardly-extending second convexity thereof.

35. The radiator support according to claim 31, wherein said rigid outer tube member has a cut-off in the flange, the cut-off exposing a portion of the bottom surface of the rubber flange of the rubber-elastic member.

36. The radiator support according to claim 35, wherein said rigid outer tube member has a plurality of the cut-offs in the flange.

37. The radiator support according to claim 36, wherein a plurality of the cut-offs are arranged at predetermined intervals in a circumferential direction of the flange.

38. The radiator support according to claim 24, wherein;
said rigid inner tube member, and said rigid outer tube member are made from a polyamide resin; and
said rubber-elastic member is made from a natural rubber.

* * * * *